United States Patent Office 2,769,390
Patented Nov. 6, 1956

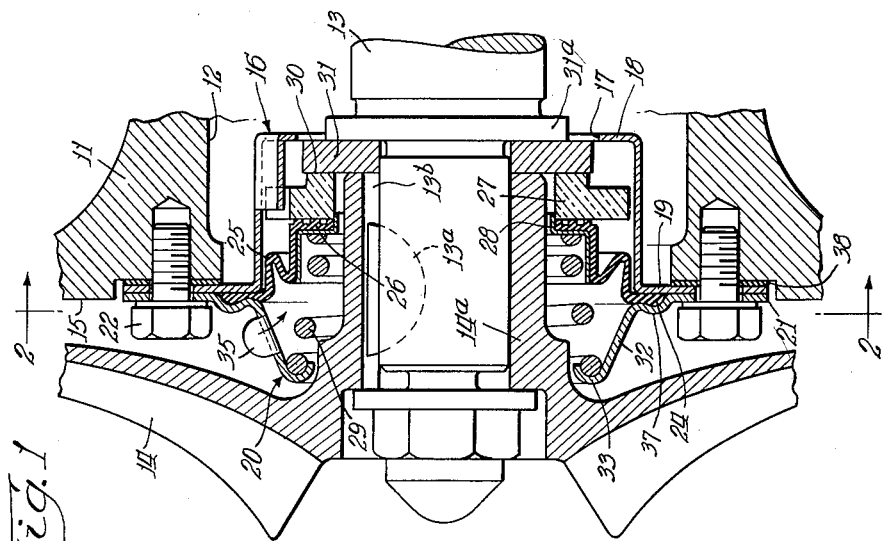

2,769,390

WATER COOLED ANNULAR SEAL

Elmer F. Heimbuch, Chicago Heights, Ill., assignor to Brummer Seal Co., Chicago, Ill., a corporation of Illinois Application June 2, 1954, Serial No. 433,900

2 Claims. (Cl. 103—111)

This invention relates to a water cooled annular seal for a rotary shaft and more particularly a device of this class adapted for heavy duty such as to prevent the passage of fluid along and around the shaft, as for example, in water pumps for diesel motor equipment.

This invention is an improvement on Olin Brummer and Elmer F. Heimbuch application Serial No. 306,892, filed August 28, 1952, for Unitary Seal Device, now U. S. Patent No. 2,722,439, issued November 1, 1955.

It has been found that in devices of the size to which the present invention is particularly directed, heat is likely to be developed to cause the sealing parts, particularly at their rotary running interfaces, to become so hot that warpage or breakage is possible or an increase of friction which impairs the sealing function. It has been found that by permitting free access of the water or other coolant to one side of the mating sealing parts, a marked reduction in heat of these parts may be advantageously effected while maintaining the sealing function of the parts.

In an important aspect, the present invention aims to provide not only means for access of the coolant to the interior of the seal for the aforestated purpose, but also baffle means associated with the access means that will direct the fluid therethrough and insure its application to the critical parts.

The invention will be described for exemplification as applied to and in connection with the aforementioned Brummer and Heimbuch application.

The invention will be understood by reference to the accompanying drawings, showing an illustrative embodiment of the invention, and in which drawings—

Figure 1 is a cross-section showing an annular seal, to which the invention is adapted, applied to the shaft of a water pump of the class referred to, portions of the water pump impeller being shown and the annular seal being of, say, full size;

Figure 2 is a face view, taken on the line 2—2 of Figure 1, showing the cover plate for the annular seal to which specifically the present invention is applied; and Figure 3 is a fragmentary edge view; taken as on the line 3—3 of Figure 2, of the cover plate.

Referring in detail to the illustrative construction shown in the drawings, the numeral 11 may indicate a water pump housing element having a counterbore 12 for the rotatable shaft 13 of the pump impeller 14 which rotates in the impeller chamber 15 from which egress of water is desired to be sealed against escape through the counterbore 12 and along the shaft 13. For this purpose, the annular seal herein shown is provided, which, in this instance, has a cup-like casing 16 at one end having an opening 17 through its rear wall 18 and having an annular brim 19 at its other end.

Partially closing the casing 16 at its last mentioned end is an annular cover plate 20 having an annular rim 21, the brim 19 and rim 21 being lappingly secured together as by bolts 22 which pass through registering bolt holes 23 in the cover plate 20 and casing 16 and are screwed into the pump housing 11. The brim 19 and rim 21 clamp between them the out-turned annular flange 24 of a collapsible elastomeric sleeve 25 that has an in-turned flange 26 at its opposite end that is pressed against an anti-friction sealing washer 27, through the intermediation of a spring clip 28, by a coil spring 29. The cover plate 20 thus also provides a cover plate for one end of the elastomeric sleeve.

The sealing disk 27 has a lapped face 30 which has rotary running sealing engagement with the opposite interface of the metallic collar or washer 31 that is pressed on and turns with the shaft 13 against a shoulder 31a therein. The cover plate 20 has a tapered or conoidal wall 32 which terminates in a reverse bend or inturned inner margin 33 and provides a seat for the spring 29 at that end thereof. The cover plate inner margin 33 laps the impeller hub 14a but receives the latter rotatively therethrough to rotate with the shaft 13 as by key 13a and keyway 13b.

In accordance with the present invention, the conoidal wall 32 is perforated as at 34, providing an aperture through which fluid from the pump chamber 15 may flow into the interior of the seal and may reach the spring clip 28 and sealing washer 27 to cool the latter part. Desirably a number of perforations or apertures 34 in the conoidal wall 32 of the cover plate 20 are spaced about the periphery of the cover plate. Desirably there are more than three of these apertures, and, in this instance, six such apertures are shown as spaced at intervals of sixty degrees around the periphery.

The apertures 34 are advantageously formed by cut-outs in the wall 32 formed by struckout portions 35 which are bent out of the plane of the wall to form the apertures. By bending the struckout portions 35 into a plane normal to the plane of the wall and causing them to be upstanding on far or the downstream side of each aperture 34, the struckout parts 35 provide baffles which direct the cooling fluid through the apertures and into the interior of the elastomeric sleeve 25. For a pump in which the impeller would rotate in the opposite direction, the baffles would be on the opposite sides of the apertures, which would still be the downstream side. As clearly shown in the drawing, each peripheral baffle 35 is disposed with its two greater dimensions lying in an axial plane relative to the shaft 13, as indicated at A for example, and A'. By reason of the conoidal wall 32 the baffles are also disposed in a common radial plane as indicated at B.

By axial plane is meant a plane which extends in the direction of the axis and is coincident therewith. By "two greater dimensions" is meant the flat area represented by the width and length of the baffle 35 as distinguished from its thickness. Operation of the device will now be explained by which it will be apparent what is meant by the terms "baffle" and far or "downstream side of the aperture":

It may be assumed that the shaft 13 and pump impeller 14 are rotating in the direction of the arrow 36 (Fig. 2). The water in the impeller chamber 15 tends to swirl in the same direction, and, since the cover plate 20 is stationary, is thrown by the force of the impellers, against the baffles 35, which trap portions of the water thus thrown against them. Such trapped water takes the path of least resistance, that is through the apertures 34 and into the interior of the sleeve 25.

By the term "water" it is intended to include water itself or any coolant provided by a fluid mixed with water or otherwise.

By "elastomeric" is meant characteristics of an elastomer such as natural or synthetic rubber, and particularly such material that is resistant to the action of changes of temperature, etc.

Desirably there is a corrugation 37 in the ring 21 which receives a thickened portion of the flange 24 for additional security, and a gasket 38 is shown about the bolts 22.

It has been found that by the use of the present invention large seals, of the type here particularly referred to, are given a markedly longer life and enhanced efficiency.

Such changes may be made as fall within the scope of the appended claims without departing from the invention.

What is here claimed is:

1. In a water pump seal arrangement, in combination, a pump impeller, a shaft arranged to rotate in a predetermined direction, said impeller having a hub keyed to rotate with the shaft, a sleeve of elastomeric material encircling said shaft spaced therefrom, a cover plate having a conoidal wall sealingly secured at its larger end to one end of the sleeve and at its smaller end telescoping over the hub with a clear running fit, a plurality of more than three peripheral perforations in said conoidal wall spaced circumferentially thereabout, each perforation being formed by a struck-out portion of said wall bent to provide an upstanding baffle for said perforation, said baffles being jointly disposed in a common radial plane intersecting said conoidal wall and each said baffle being disposed with its two greater dimensions lying substantially in an axial plane relative to said shaft and being on the far side of its perforation looking in the direction of rotation of the shaft, whereby, upon actuation of said impeller by said shaft, water activated thereby is circulated annularly in said direction about said conoidal wall and is directed by said baffles through said perforations into the space within said sleeve, and means at the other end of the sleeve providing a rotary running sealing engagement between said sleeve and said shaft.

2. In a water pump seal arrangement, in combination, a pump impeller, a shaft arranged to rotate in a predetermined direction, said impeller having a hub keyed to rotate with the shaft, a sleeve of elastomeric material encircling said shaft spaced therefrom, a cover plate having a conoidal wall sealingly secured at its larger end to one end of the sleeve and at its smaller end telescoping over the hub with a clear running fit, a plurality of more than three peripheral perforations in said conoidal wall spaced circumferentially thereabout, each perforation being formed by a struck-out portion of said wall bent to provide an upstanding baffle for said perforation, said baffles being jointly disposed in a common radial plane intersecting said conoidal wall and each said baffle being on the far side of its perforation looking in the direction of rotation of the shaft, whereby, upon actuation of said impeller by said shaft, water activated thereby is circulated annularly in said direction about said conoidal wall and is directed by said baffles through said perforations into the space within said sleeve, and means at the other end of the sleeve providing a rotary running sealing engagement between said sleeve and said shaft.

References Cited in the file of this patent

UNITED STATES PATENTS

| | | |
|---|---|---|
| 2,347,118 | Matter | Apr. 18, 1944 |
| 2,418,185 | McConaghy | Apr. 1, 1947 |
| 2,610,872 | Hayes | Sept. 16, 1952 |
| 2,722,439 | Brummer et al. | Nov. 1, 1955 |

FOREIGN PATENTS

| | | |
|---|---|---|
| 467,935 | Great Britain | June 25, 1937 |